UNITED STATES PATENT OFFICE.

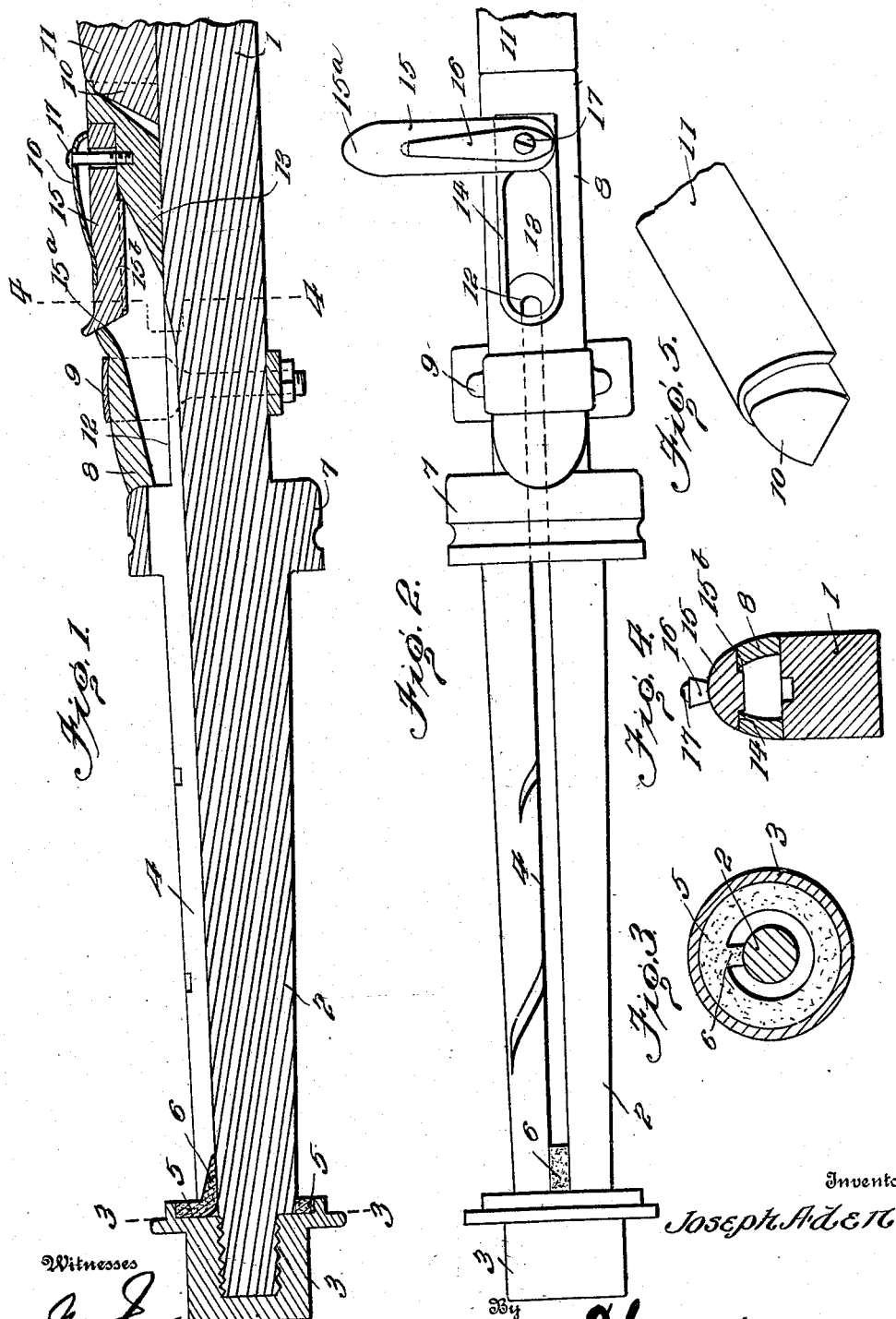

JOSEPH ADEN, OF GREENSBORO, NORTH CAROLINA.

AXLE-LUBRICATOR.

No. 924,214.    Specification of Letters Patent.    Patented June 8, 1909.

Application filed October 20, 1908. Serial No. 458,620.

*To all whom it may concern:*

Be it known that I, JOSEPH ADEN, citizen of the United States, residing at Greensboro, in the county of Guilford and State of North Carolina, have invented certain new and useful Improvements in Axle-Lubricators, of which the following is a specification.

The present invention relates to certain new and useful improvements in axle lubricating devices and has for its primary object to provide a device of this character which embodies a novel construction whereby it can be readily applied to the axle and will operate in an effective manner either to direct lubricant into the lubricating channel of the spindle or to direct a rod into the same for cleaning purposes.

The invention further contemplates an axle lubricating device which is inexpensive in its construction, is economical in the use of lubricant, and is practically dust proof.

For a full understanding of the invention and the merits thereof, and to acquire a knowledge of the details of construction, reference is to be had to the following description and accompanying drawing, in which:

Figure 1 is a vertical longitudinal sectional view through an axle having the lubricating device applied thereto; Fig. 2 is a top plan view of the same, the closure being turned to one side; Fig. 3 is a transverse sectional view through the outer end of the spindle on the line 3—3 of Fig. 1; Fig. 4 is a transverse sectional view on the line 4—4 of Fig. 1; and Fig. 5 is a detail perspective view of one end of the bed which extends along the top of the axle.

Corresponding and like parts are referred to in the following description and indicated in all the views of the drawing by the same reference characters.

Specifically describing the present embodiment of the invention, the numeral 1 designates an axle which terminates at its end in a spindle 2, the said spindle tapering toward the extremity thereof, which is threaded for the reception of the usual nut 3. The longitudinally disposed lubricant receiving and distributing groove 4 is formed in the top of the spindle 2, the outer end of the groove extending through the end of the spindle. A washer 5 of any suitable material such as leather is fitted over the end of the spindle so as to be interposed between the nut 3 and the hub of a wheel mounted upon the spindle, and this washer is formed with an inwardly extending lug 6 which fits within the groove 4 so as to prevent the escape of lubricant through the end thereof. As shown on the drawing this lug 6 extends along the base of the groove for a short distance and has a beveled formation. A collar 7 is located at the inner end of the spindle and the groove 4 extends through the collar and beyond the same for a short distance in the top of the axle.

Fitted against the upper face of the axle 1 and abutting against the collar 7 is a block 8 which is held in position by any suitable means such as the clip or U bolt 9. The inner end of the block is formed with a recess designed to receive a tongue 10 at the outer end of a wooden bed piece 11 which extends along the top of the axle. The lower face of the block is grooved adjacent the collar 7 to form a chamber 12 which fits over the portion of the lubricant distributing channel 4 in the axle and also communicates with the opening through the collar 7 formed by the channel. The end of the chamber 12 most remote from the collar terminates in an inwardly inclined wall 13 which leads to a substantially horizontal opening 14 in the top of the block. This opening 14 is normally closed by means of a laterally swinging closure 15, the swinging end of which is beveled upwardly at $15^a$ to correspond to the upwardly beveled walls at the outer end of the opening. It will be observed, however, that the end of the closure projects upwardly slightly above the top of the block to admit of a finger hold being obtained upon the closure for moving the same. It will also be observed that the two longitudinal sides of the closure are rabbeted at $15^b$ for engagement with the sides of the opening 14, a spring 16 being utilized for forcing the closure inward so that it cannot be accidentally swung to either side when in a closed position. The spring is in the form of a strip, the extremities of the strip bearing against the closure 15, while the intermediate portion thereof is bowed upwardly and engages the enlarged head of the pivot pin 17 upon which the closure 15 is mounted. When it is desired to open the closure for the purpose of supplying the device with a quantity of lubricant or for inserting a cleaning rod through the same, the free end of the closure is moved upwardly until the rabbeted portions $15^b$ of the closure are disengaged from the sides of the opening, the closure being then swung laterally to one side. It will thus be obvious that, while the closure can be readily opened when desired, it is normally held against accidental opening and is so constructed as to provide a substantially dust proof joint. Attention may also be directed to the fact that the inclined wall 13 at the inner end of the chamber 12 may serve either to direct lubricant into the channel 4 or to direct a cleaning rod into the said channel as may be desired.

The block 8 may either be formed integral with the axle or it may be made separate and cemented thereto with any suitable cement or white lead and held rigidly in position by a clamp. In either instance the inner end of the block would be formed with a socket to receive the tongue 10 of the wooden bed 11, thereby forming a secure joint with the said member.

Having thus described the invention, what I claim as new is:

1. The combination with an axle having a spindle formed at its inner end with a collar, and having a lubricating channel in the side of the spindle leading through the collar and extending beyond the same, of a block fitted upon the axle and abutting against said collar, the said block being formed with a chamber leading to the channel, and a top opening communicating with said channel, the walls of said opening being horizontally disposed but extending in an outwardly beveled direction at the outer end of the opening, whereby to assist in directing a quantity of lubricant or a cleaning rod through the channel, a closure fitted to swing laterally over the said opening and formed with a rabbeted lower face designed to fit within said opening, a pivot pin secured to the block and upon which the closure is designed to swing, and a bowed spring engaging the top of the closure and secured intermediate its ends on the said pivot pin, the outer end of said closure being beveled correspondingly to the beveled walls of the outer end of the opening and projecting outwardly and upwardly in closed position beyond said beveled walls, for the purpose specified.

2. The combination with an axle having a spindle formed at its inner end with a collar, and having a lubricating channel in the side of the spindle leading through the collar and extending beyond the same, of a block fitted upon the axle and abutting against the collar the said block being formed with a chamber leading to the channel and a top opening communicating with said channel, the walls of said opening being outwardly beveled at the outer end of the opening whereby to assist in directing a quantity of the lubricant or a cleaning rod through the channel, a closure fitted to swing laterally over said opening and formed with a rabbeted lower face designed to fit within the opening, a pivot pin secured to the block and upon which the closure is designed to swing, and a spring engaging the top of said closure and secured intermediate its ends on the said pivot pin, the outer end of said closure being beveled correspondingly to the beveled walls of the outer end of the opening and projecting outwardly and upwardly in closed position beyond said beveled walls for the purpose specified.

In testimony whereof I affix my signature in presence of two witnesses.

JOSEPH ADEN. [L. S.]

Witnesses:
 F. K. STOVER,
 H. L. COBLE.